Oct. 8, 1968  R. A. SLAY  3,404,746

MOTOR-DRIVEN WHEELED VEHICLES

Filed July 8, 1966  6 Sheets-Sheet 1

Oct. 8, 1968   R. A. SLAY   3,404,746
MOTOR-DRIVEN WHEELED VEHICLES
Filed July 8, 1966   6 Sheets-Sheet 2

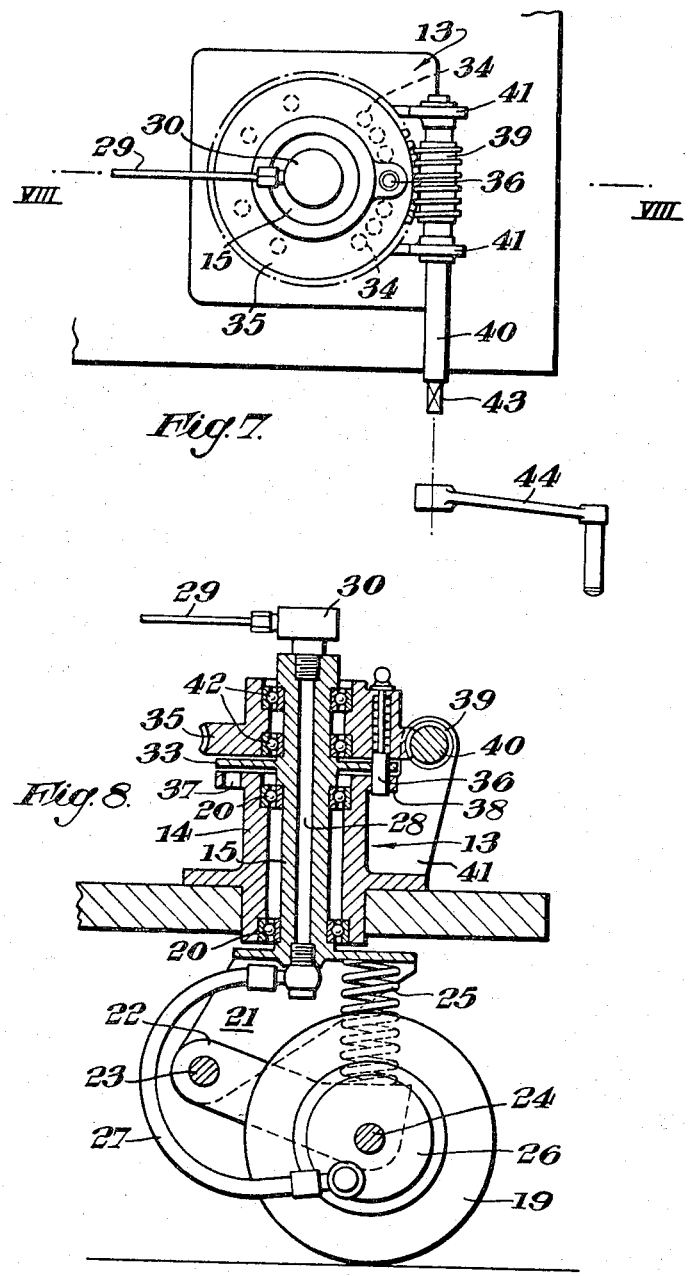

Oct. 8, 1968 R. A. SLAY 3,404,746
MOTOR-DRIVEN WHEELED VEHICLES
Filed July 8, 1966 6 Sheets-Sheet 4

Oct. 8, 1968 R. A. SLAY 3,404,746
MOTOR-DRIVEN WHEELED VEHICLES
Filed July 2, 1966 6 Sheets-Sheet 3

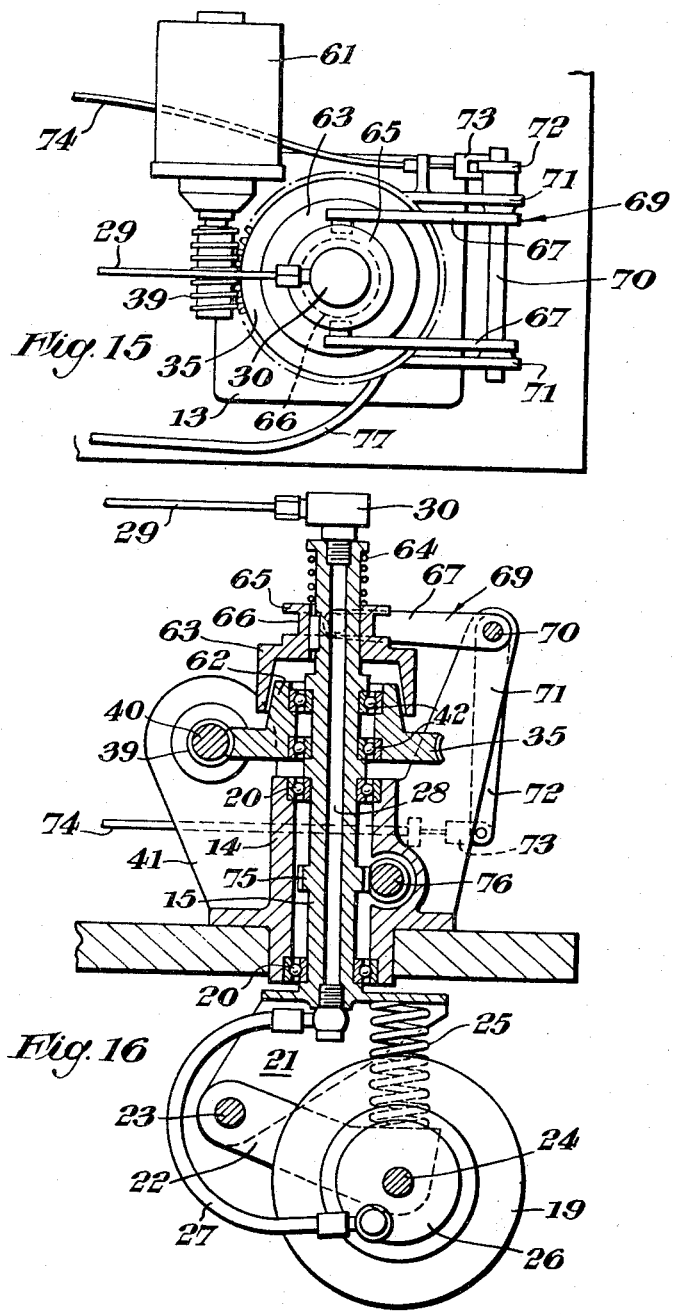

United States Patent Office 3,404,746
Patented Oct. 8, 1968

3,404,746
MOTOR-DRIVEN WHEELED VEHICLES
Reginald A. Slay, Flat 35, Grandcourt,
Eastbourne, Sussex, England
Filed July 8, 1966, Ser. No. 563,743
7 Claims. (Cl. 180—23)

ABSTRACT OF THE DISCLOSURE

A motor-driven vehicle which can change direction at right angles including at least one castor wheel mounted on the front and rear thereof respectively and at least one driving wheel intermediate the front and rear wheels. The driving wheel is pivotaly mounted on a vertical axis and is connected to motor means which pivots therewith and imparts directional drive to the vehicle.

---

This invention concerns motor-driven wheeled vehicles.

Hitherto, a disadvantage of wheeled vehicles, such as motorcars, trucks, dumpers and the like has been the limitations as to the manouverability thereof. Such vehicles cannot change direction at right angles, for example, without following a course approximating to a quadrant of a circle.

It is an object of the present invention to provide a motor-driven vehicle of such construction that the aforesaid disadvantage is obviated.

According to the present invention, there is provided a motor-driven wheeled vehicle having at least one castor wheel at the front and at least one castor wheel at the rear, and intermediate the front and rear wheels, one or more ground bearing driving wheels mounted for pivoting about a vertical axis, pivoting of such driving wheel or wheels causing corresponding directional drive to the vehicle.

Preferably, there are two castor wheels at the front and two castor wheels at the rear of the vehicle.

Locking means may be provided so that each or adjacent ones of the castor wheels may be locked in a particular direction.

The driving wheels, in one embodiment, are pivotable through 360° about the vertical axis. In a second embodiment, a power drive to the driving wheels is fitted with a reverse gear and the driving wheels are only capable of pivoting through 180°.

Each castor wheel is conveniently resiliently mounted in a chassis of the vehicle.

The driving wheels may be mounted in a yoke secured below a rotatable platform.

The platform may support a power drive means for the driving wheels.

The driving wheels are advantageously vertically movable whereby to permit pivotal movement thereof whilst the vehicle is stationary.

In a preferred embodiment, the driving wheels are spring urged into contact with the ground, in their lowered position.

The invention will be described further, by way of example, with reference to the accompanying drawings, in which:

FIGURE 7 is a fragmentary plan view, to an enlarged scale, of one of the castor wheels of the vehicle of FIGURE 1;

FIGURE 8 is a vertical section on the line VIII—VIII of FIGURE 7;

FIGURES 15 and 16 are views, similar to FIGURES 7 and 8, of a castor wheel of the vehicle shown in FIGURE 9.

In the drawings, like reference numerals refer to similar parts.

Figure 1:
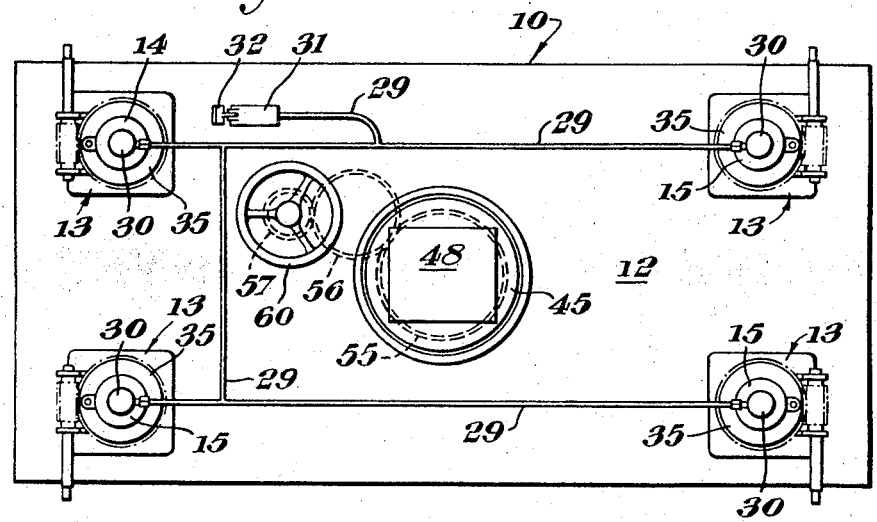
FIGURE 1 is a diagrammatic plan view of a motor driven wheeled vehicle constructed in accordance with the present invention.
Figure 2:
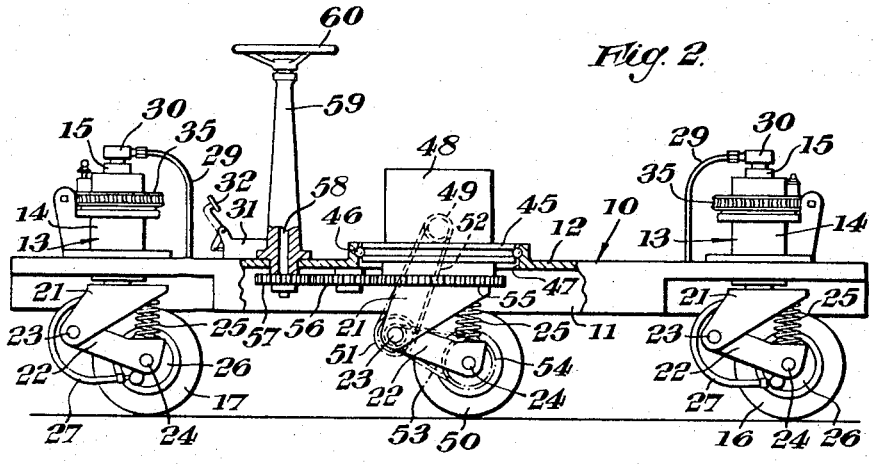
FIGURE 2 is a side view, partly in section, of the vehicle shown in FIGURE 1.

As shown in FIGURES 1 to 8 of the drawings, a motor-driven wheeled vehicle, constructed in accordance with a first embodiment of the present invention, comprises a chassis 10 of generally rectangular form composed of longitudinal side members 11, and a platform 12. The chassis is of suitable strength metal and may be of welded or bolted construction. A castor mounting 13 is provided adjacent each corner of the chassis 10.

Each castor mounting 13 comprises a sleeve 14 which receives, in its axial bore, a castor spindle 15 of a respective castor wheel 16, 17, 18 or 19.

The spindle 15 is supported, in the axial bore, by two bearings 20, which may be ball, roller, or thrust bearings as required, so as to be freely rotatable therein.

At its lower end, each spindle 15 has a yoke 21 carrying a pair of swinging arms 22 each pivoted by one end on a pin 23 between the arms of the yoke and carrying an axle 24 between their free ends. One of the ground bearing castor wheels 16, 17, 18 or 19 is mounted on the axle 24. A coiled spring 25 is mounted between one of the arms 22 and the yoke to provide resilient mounting of the castor wheel.

Each castor wheel has a brake 26, shown in the drawings as a hydraulic brake, supplied with fluid under pressure through a flexible duct 27 which is secured in the lower end of an axial bore 28 of the respective spindle 15. The bore 28 acts as a duct for the fluid and is supplied therewith by a tube 29 through a swivel union 30. The tube 29 connects with a master cylinder 31 wherein the fluid is compressed by means of a foot pedal 32.

Each spindle 15 has, intermediate its ends, a disc like flange 33 located above the sleeve 14. The flange 33 has a plurality of angularly spaced locking apertures 34 of which only a few are shown in dotted lines in FIGURE 7.

A worm wheel 35 is rotatably mounted in bearings 42 on the spindle 15 above the flange 33 and carries a vertically slidable spring loaded locking pin 36 alignable with the apertures 34 to lock the worm wheel to the spindle 15. The pin 36 is engageable, through any one of the holes 34, with one of a plurality of apertures or recesses 37 in an upper flange 38 of the sleeve 14 whereby the worm wheel 35 and the spindle 15 may be locked in position relative to the sleeve 14.

The worm wheel 35 and the spindle 15 are rotatable, when the pin 36 is retracted from the recesses 37, by a worm 39 on a shaft 40 journalled in brackets 41 secured to the sleeve 14. The shaft 40 is keyed at 43 to receive a winding handle 44 serving to rotate the worm 39. The pin 36 is retractable further to free the flange 33 and to permit the spindle 15 to rotate freely.

Each of the castor wheels 16, 17, 18 and 19 is mounted as above described.

A circular platform 45 is rotably mounted, in a bearing 46, in a circular aperture 47 centrally of the platform 12. The platform 45 carries a motor (not shown) which may be an electric motor or an internal combustion engine, in a housing 48. The motor has an output pulley 49. Mounted below the platform 45 is a yoke 21 carrying swinging arms 22 which support a driving wheel 50. The wheel 50 is resiliently mounted by means of a coiled compression spring 25 in a substantially identical manner to each of the castor wheels 16, 17, 18 and 19. However, the pin 23 rotatably carries two corotatable pulley wheels 51 one of which is driven through a belt 52 from the output pulley 49 and the other of which drives, through a belt 53, a pulley wheel 54 mounted for rotation with the drive wheel 50.

The platform 45 has a gear wheel 55 coaxially secured thereto. The gear wheel 55 meshes with an idler gear 56 which, in turn, meshes with a gear 57 mounted on the lower end of a steering shaft 58 journalled in a column 59 and carrying a steering wheel 60 on its upper end. Thus, turning of the steering wheel 60 rotates the platform 45 to alter the direction of the driving wheel 50. The ratios of the gears 55, 56 and 57 is chosen to provide the desired turning effect of the drive wheel 50 for one complete rotation of the steering wheel 60.

Figure 3:
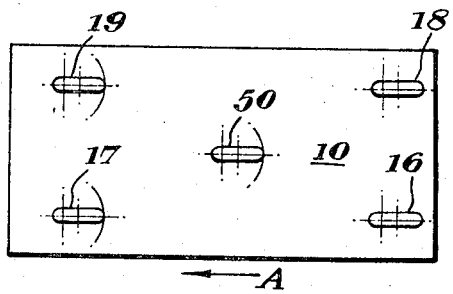
FIGURES 3 to 6 are diagrammatic plan views illustrating the positions of driving and castor wheels of the vehicle for various directions of motion of the vehicle.
Figure 4:
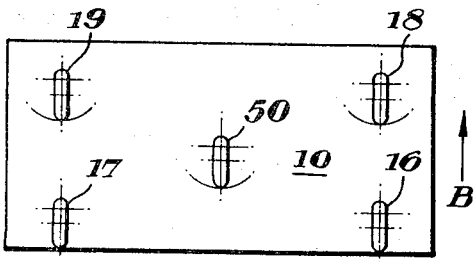

In operation the vehicle can be driven in any desired direction. Reference will be made to FIGURE 3 to 6 to show the state of the castor wheels 16, 17, 18 and 19 and of the driving wheel 50, for particular directional travel. In FIGURE 3, the vehicle is to travel in the direction of the arrow C. The wheels 16 and 18 are are locked in a trailing position parallel to the arrow A by rotation to such position by the handle 44 and then by insertion of their respective locking pins 36.

The steering wheel 60 (not shown) is turned to position the drive wheel 50 in a trailing position parallel to the arrow A. The wheels 17, 19 are left free to castor and will automatically align themselves so as to trail in the direction of the arrow A. Changes in direction can be made by turning the steering wheel 60 and the vehicle can turn in an extremely small circle.

However, if it is desired to move at right angles to the arrow A, i.e. in the direction of the arrow B (FIGURE 4), then the wheels 16 and 17 are locked so as to trail parallel to the arrow B, the steering wheel 60 is turned to align the wheel 50 in a trailing position parallel to the arrow B and, on movement, the wheels 18 (which is now unlocked) and 19, castor to a trailing position parallel to the arrow B.

Figure 5:
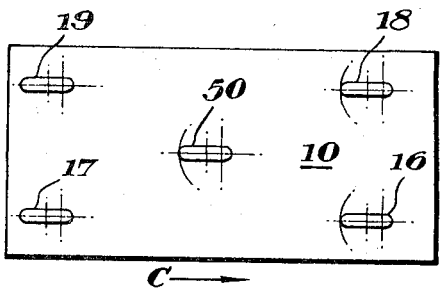

FIGURE 5 illustrates travel of the vehicle in the direction of the arrow C. The wheels 16 and 18 are free to castor and the wheels 17 and 19 are locked as shown. The steering wheel 60 is turned to position the drive wheel 50 as shown.

Figure 6:
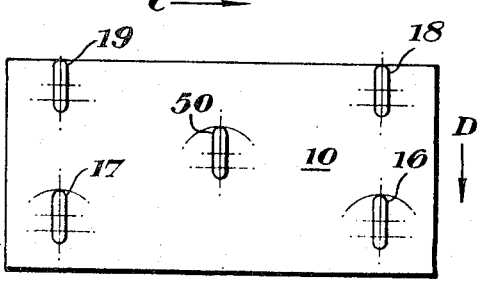
Figure 9:
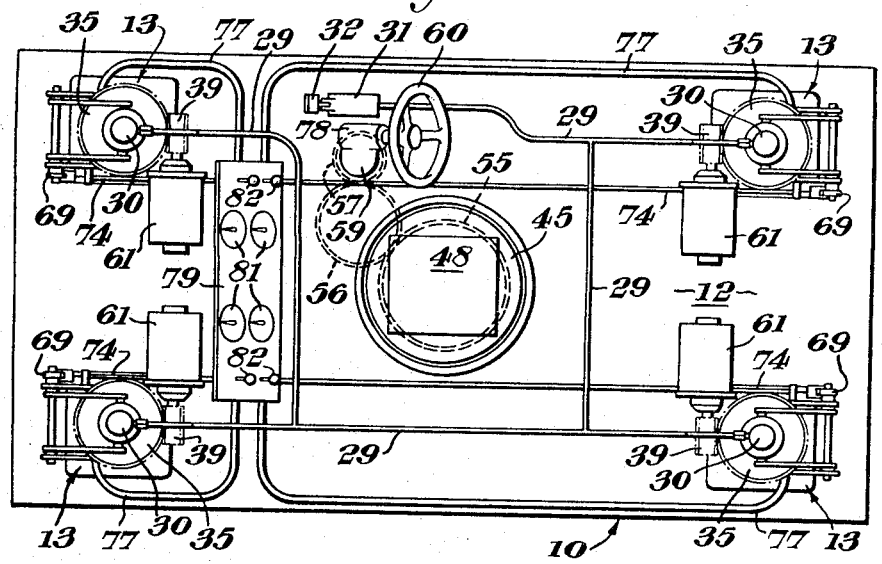
FIGURE 9 is a view, similar to FIGURE 1, of a second embodiment of vehicle in accordance with the present invention.
Figure 10:
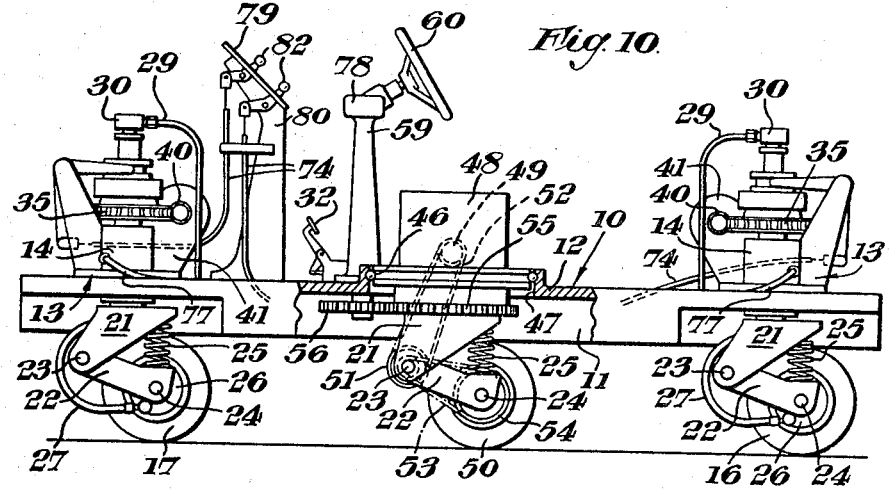
FIGURE 10 is a view, similar to FIGURE 2, of the vehicle shown in FIGURE 9.
Figure 11:
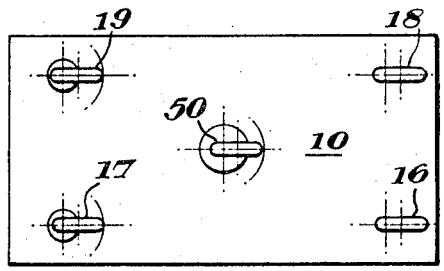
FIGURES 11 to 14 are views, similar to FIGURES 3 to 6, but corresponding to the vehicle shown in FIGURE 9.
Figure 13:
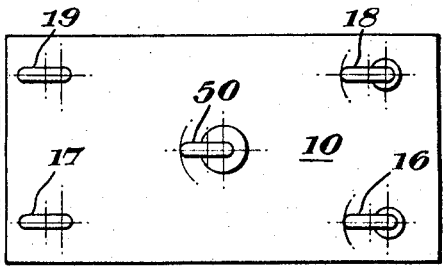
Figure 12:
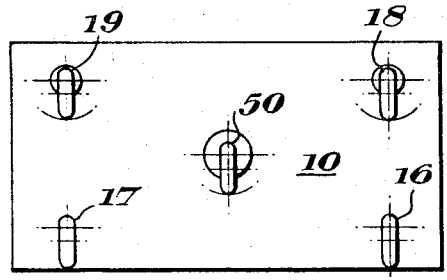
Figure 14:
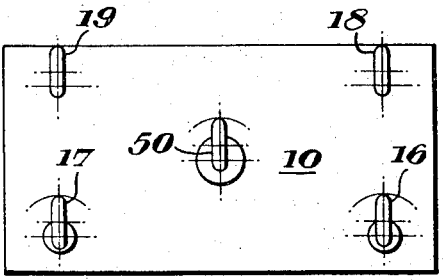

FIGURE 6 illustrates travel of the vehicle in the direction of the arrow D. The wheels 18 and 19 are locked in the positions shown. The wheels 16 and 17 are free to castor and the steering wheel 60 is turned to position the drive wheel 50, as shown.

It will be appreciated that, starting from each of the positions shown in FIGURES 3 to 6, the vehicle is fully manouverable, can be driven in any direction and has a very small turning circle. It is only when it is desired to move the vehicle at right angles, without going round a turning circle that alteration of the locking of the wheels 16 to 19 is necessary.

However, as will be seen from the embodiment shown in FIGURES 9 to 16, the locking of the castor wheels in the desired positions can be greatly facilitated and remotely controlled by the driver of the vehicle.

FIGURES 9 to 16 correspond respectively to FIGURES 1 to 8 and illustrate a more advanced prototype of a motor-driven vehicle in accordance with the present invention. The vehicles of the two embodiments are basically the same and like reference numerals have been used for similar parts. Further, to avoid undue repetition, only those parts of the vehicle of FIGURES 9 to 16 which differ from the construction of the vehicle shown in FIGURES 1 to 8 are described.

In FIGURES 9 and 10 and FIGURES 15 and 16, the illustrated vehicle is equipped with power driven means for turning the castor wheels. Thus, the worm 39 of each castor unit 13 is provided on the shaft 40 of a motor 61 supported adjacent the unit so as to engage the worm wheel 35 of the unit, the shaft 40 extending through and being journalled in at least one bracket 41.

As in the previous embodiment, the worm wheel 35 is freely rotatable on the castor spindle 15, but an upper part thereof is formed as one half 62 of a conical clutch the other half 63 of which is splined on the spindle 15 and is resiliently urged towards clutching engagement with the half 62 by a spring 64.

The half 63 has a collar 65 with a groove 66 wherein locates a yoke 67 forming one arm of a bell crank lever 69 pivoted on a pin 70 in a bracket 71 of the unit 13. The other arm 72 of the lever 69 receives a nipple 73 of a Bowden cable 74.

The spindle 15 has a further worm wheel 75 engaged by a worm shaft 76 which is connected to a flexible drive 77.

The purpose of the Bowden cables 74 and the flexible drives 77 will be described in detail later.

The steering wheel 60 of the advanced prototype is mounted at a more convenient angle and drives a vertical steering shaft (similar to the steering shaft 58) through a worm gear arrangement mounted in a casing 78 at the head of the steering column 59.

Mounted forwardly of the position normally occupied by a driver of the vehicle is a control panel 79 carried by a pair of brackets 80 (of which only one is shown). The panel 79 carries four dials 81 each indicative of the position of a respective one of the caster wheels 16, 17, 18 and 19. The dials each include a pointer driven through the respective flexible drive 77 from the corresponding caster wheel. The control panel also carries four levers 82 each capable of operating a respective one of the conical clutches 62, 63 through the corresponding Bowden cable 74. In a rest position of the levers 82, the clutches 62, 63 are preferably disengaged, whereby the respective spindles 15 are free to rotate and their wheels 16, 17, 18 and 19 to castor.

In a second position of the levers 82, the clutches 62, 63 are engaged whereby the spindles are locked. The worm wheel drive being, for all practical purposes, irreversible. The levers 82 may have a third position wherein the clutches 62, 63 are still engaged but wherein the respective motor 61 is switched on to change the position of the castor wheel, which change is, of course, indicated on the respective dial 81.

It is thus possible to lock any one, any two, any three or four of the castor wheels 16, 17, 18 and 19 from the drivers position and, when desired, also to rotate one or more of the castor wheels to a required position wherein they can be locked or allowed to castor.

The driving wheel 50, its mounting and operation, are identical to that described in relation to FIGURES 1 to 8.

As aforesaid, FIGURES 11 to 14 correspond respectively to FIGURES 3 to 6, but it will be appreciated that the positions shown of the locked castor wheels (16 and 18 in FIGURE 1, 16 and 17 in FIGURE 2, 17 and 19 in FIGURE 3 and 18 and 19 in FIGURE 4) can be achieved by moving the respective levers 82 to their second and, if required, their third positions.

Figure 17:
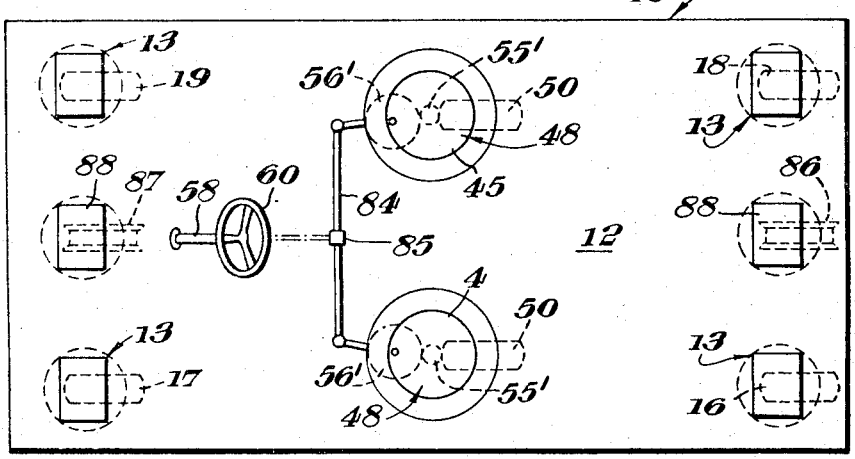
FIGURE 17 is a diagrammatic plan view of a third embodiment of the motor-driven vehicle in accordance with the present invention.

A third embodiment of a motor driven vehicle is shown diagrammatically in FIGURE 17. The vehicle has four castor units 13, one adjacent each corner of a rectangular platform 12 thereof and each unit supporting a respective castor wheel 16, 17, 18 or 19. The units 13 may be identical with those hereinbefore described.

Two drive units 48 are each mounted on a rotatable platform 45 and support a respective drive wheel 50.

These drive units 48 may conveniently be identical with the drive units described in relation to previous embodiments with two exceptions. Firstly, they are conveniently lockable against rotation, if desired, and secondly, for alignment, a different steering arrangement is necessary.

Each platform 45 has a gear wheel 55' driven by a gear 56'. The gears 56' of the two units are connected directly to a track rod 84 operated from a normal steering box 85. The track rod 84 is capable of being lengthened when both drive wheels 50 are turned at right angles to the position shown.

This vehicle may, as shown, be fitted with track holding wheels 86, 87, mounted on castor units 88 similar to the units 13. With all four castor wheels 16, 17, 18 and 19 free to castor, this vehicle can follow a rail track or a groove track (when provided with correspondingly shaped wheels 86, 87). The track wheels 86, 87 may be vertically retractable to permit the vehicle to operate normally.

This third embodiment of vehicle operates in substantially the same manner as the previously described embodiments. However, if the platforms 45, and hence the wheels 50, are locked, then the vehicle may be steered by faster or slower operation of one drive unit 48 relative to the other, i.e. throttle and brake control of the drive wheels as in tracklaying vehicles.

An important advantage of this embodiment of vehicle is that, with the drive wheels locked and parallel and the castor wheels free to castor, if one drive wheel is driven forwardly and the other drive wheel is driven in reverse, the vehicle will pivot about its centre.

The invention is not confined to the precise details of the foregoing embodiments and many variations are possible. For example, to facilitate steering of the drive wheels 50 whilst the vehicle is stationary, the drive wheels may be retractable to clear the ground. Two drive wheels may be driven from a single engine through flexible or other drives and, in such instance, the vehicle may be steered by operation of clutches interposed in the drive to the respective drive wheels. If the vehicle is to be driven and steered by two drive wheels, the castor units should remain free for their wheels to castor.

There may be only one castor wheel centrally of one end of the vehicle and two castor wheels at the other end. However, if two drive wheels are provided, it is only necessary to have two castor wheels, one centrally of each end.

The drive unit may be provided as a separate entity for clamping onto an existing chassis having castor wheels.

The castor wheels 16, 17, 18 and 19 and each drive wheel 50 may have solid, pneumatic or foam filled tyres.

The drive wheels 50 may be limited to being turned through only 180°, if the drive thereto is reversible, but are normally rotatable through 360°.

Other variations are possible within the scope of the present invention.

I claim:

1. A motor-driven wheeled vehicle comprising in combination a chassis, two castor wheels at the front thereof, two castor wheels at the rear thereof and a ground-bearing driving wheel mounted intermediate the front and rear of the vehicle for pivoting about a vertical axis, motor means mounted for pivoting with said driving wheel for driving the same to impart directional drive to said vehicle, locking means on each of said castor wheels for locking said castor wheels in a particular orientation, power drive means for orienting said castor wheels to a desired orientation, said power drive means including a respective motor for each of said castor wheels, a worm and wheel drive train between each said motor and said castor wheel, and a clutch for completing said drive train.

2. A motor-driven wheeled vehicle according to claim 1, wherein said locking means includes means for locking an adjacent pair of said castor wheels, in parallel orientation, simultaneously.

3. A motor-driven wheeled vehicle according to claim 1, wherein each said castor wheel is mounted by swinging arms on a vertical pillar, said vertical pillar being mounted in the chassis of said vehicle.

4. A motor-driven wheeled vehicle according to claim 1, wherein said motor means is capable of operating forwardly or in reverse and said drive wheel is mounted for pivoting about said vertical axis only through 180°.

5. A motor-driven wheeled vehicle according to claim 1, wherein said drive wheel is mounted for vertical movement so as to facilitate pivoting thereof about said vertical axis while said vehicle is stationary.

6. A motor-driven wheeled vehicle according to claim 1, including a further ground-bearing driving wheel mounted for pivoting about a vertical axis, said ground-bearing driving wheels being connected for co-rotation about their vertical axes.

7. A motor-driven wheeled vehicle according to claim 6, further including a track-engageable wheel at said front of said vehicle and a track-engageable wheel at said rear of said vehicle, said track-engageable wheels being vertically movable.

References Cited

UNITED STATES PATENTS

| | | | |
|---|---|---|---|
| 1,124,273 | 1/1915 | Bernheim | 104—245 X |
| 1,222,260 | 4/1917 | Brown | 180—22 X |
| 1,804,541 | 5/1931 | Perin | 280—47.11 X |
| 3,023,825 | 3/1962 | Rabjohn | 180—15 |
| 3,031,024 | 4/1962 | Ulinski | 180—52 X |
| 3,090,516 | 5/1963 | Seymour et al. | 280—47.11 X |
| 3,197,229 | 7/1965 | Houlton. | |
| 3,263,765 | 8/1966 | Just et al. | 180—19 |

BENJAMIN HERSH, *Primary Examiner.*

J. A. PEKAR, *Assistant Examiner.*